US012480742B2

(12) United States Patent
Theisinger et al.

(10) Patent No.: US 12,480,742 B2
(45) Date of Patent: Nov. 25, 2025

(54) DUAL ILLUMINATION OPTICAL SIGHT

(71) Applicants: Hermann Theisinger, Vienna (AT); Gavin James Palmer, Bern (CH); Karsten Richter, Bern (CH)

(72) Inventors: Hermann Theisinger, Vienna (AT); Gavin James Palmer, Bern (CH); Karsten Richter, Bern (CH)

(73) Assignee: SUPAS LTD, Hong Kong (CN)

( * ) Notice: Subject to any disclaimer, the term of this patent is extended or adjusted under 35 U.S.C. 154(b) by 0 days.

(21) Appl. No.: 18/412,893

(22) Filed: Jan. 15, 2024

(65) Prior Publication Data
US 2024/0240917 A1    Jul. 18, 2024

Related U.S. Application Data

(60) Provisional application No. 63/439,258, filed on Jan. 16, 2023.

(51) Int. Cl.
*F41G 1/473* (2006.01)
*F41G 1/38* (2006.01)

(52) U.S. Cl.
CPC ........... *F41G 1/473* (2013.01); *F41G 1/38* (2013.01)

(58) Field of Classification Search
CPC ..... F41G 1/30; F41G 1/32; F41G 1/34; F41G 1/345; F41G 1/38; F41G 1/473
USPC .......................... 42/111, 113, 123, 131, 132
See application file for complete search history.

(56) References Cited

U.S. PATENT DOCUMENTS

| | | | | |
|---|---|---|---|---|
| 3,784,817 A * | 1/1974 | James | ...... | F41G 1/32 250/467.1 |
| 4,764,011 A * | 8/1988 | Goldstein | ...... | G02B 23/12 42/113 |
| 5,205,044 A * | 4/1993 | DePaoli | ...... | F41G 1/30 42/144 |
| 5,924,234 A * | 7/1999 | Bindon | ...... | G02B 27/34 33/298 |
| 7,502,166 B2 * | 3/2009 | Stenton | ...... | G02B 23/14 359/428 |
| 7,877,921 B1 * | 2/2011 | Stenton | ...... | F41G 1/34 42/131 |
| 10,345,587 B1 * | 7/2019 | Loebig | ...... | G02B 27/0103 |
| 2004/0047586 A1 * | 3/2004 | Schick | ...... | F41G 1/38 42/132 |

(Continued)

FOREIGN PATENT DOCUMENTS

DE    0651226 A1 *  5/1995 ............... F41G 1/38

*Primary Examiner* — Troy Chambers
*Assistant Examiner* — Benjamin S Gomberg
(74) *Attorney, Agent, or Firm* — Ian Burns; ATIP Law

(57) ABSTRACT

An optical sight for a firearm can be provided with multiple light sources for illuminating one or more aiming marks on the sight. The light sources may be multiple LEDs, e.g. of different colors that can provide illumination in different lighting conditions. The lights sources may also be physical process driven light sources, such as a Gaseous Tritium Light Source (GTLS). A combination of LEDs and GTLS may also be used. The light sources may be disposed at multiple focal points of a multi-lens system. Alternatively, a selector may be used to selectively locate one of the light sources at the focal point of a single lens system. The optical sight may be a reflex sight, e.g. for a handgun, or may be a riflescope for a rifle.

10 Claims, 6 Drawing Sheets

(56) References Cited

U.S. PATENT DOCUMENTS

| | | | |
|---|---|---|---|
| 2007/0107292 A1* | 5/2007 | Bar-Yona | F41G 1/30 42/144 |
| 2009/0100735 A1* | 4/2009 | Schick | F41G 1/345 42/131 |
| 2010/0083554 A1* | 4/2010 | Elpedes | F41G 1/30 42/130 |
| 2013/0188180 A1* | 7/2013 | Jakob | F41G 1/30 356/248 |
| 2014/0041277 A1* | 2/2014 | Hamilton | F41G 1/38 42/122 |
| 2015/0109602 A1* | 4/2015 | Martin | F41G 1/32 356/3 |
| 2018/0128574 A1* | 5/2018 | Crispin | G02B 23/105 |
| 2020/0025515 A1* | 1/2020 | Thomas | F41G 3/08 |
| 2021/0333067 A1* | 10/2021 | Kennedy | G02B 23/00 |
| 2023/0096514 A1* | 3/2023 | Nichols | F41G 1/30 42/132 |

* cited by examiner

DUAL ILLUMINATION OPTICAL SIGHT

CROSS REFERENCE TO RELATED APPLICATIONS

This application claims priority to U.S. Provisional Patent Application Ser. No. 63/439,258 filed 16 Jan. 2023, the contents of which are incorporated herein by reference.

FIELD OF THE INVENTION

The present invention relates to optical sights for weapons.

BACKGROUND

Optical sights have been common as an aid to sighting of weapons. In a telescopic sight, an aiming mark is illuminated by means of an electric power driven light source such as a light emitting diode (LED) or by means of a physical process such as phosphorescence, by example but not exclusively gaseous tritium (GTLS/gaseous tritium light source). In a reflex sight the light emitting element itself creates the aiming mark on the lens by means of projection.

The typical components of an electric power driven light source include an LED as the light source, circuit board, battery, controls and for some applications a fiber optical element to position the point of light emission. The typical components of a physical process driven light source include capillary tubes filled with luminescent powder and Tritium gas and fiber optical element to position the point of light emission.

It is common to fit an optical sight with either an electric power or a physical process driven light source, but not both combined in one optical sight device, each having their own specific advantages. For example, electric power driven systems provide sufficient light density to illuminate aiming marks to be visible in bright daylight conditions, while physical process driven systems are commonly considered as ideal for illuminating aiming marks in lowest light conditions without over lighting the target.

One specific disadvantage of physical process driven illumination systems such as GTLS-based sources is that the intensity can diminish over time due to decay, thus reducing visibility of the illuminated aiming mark. It can also be difficult to demonstrate a physical process driven illumination system in daylight conditions because of the low brightness level common for luminescent light sources.

What is required is an improved illumination system for optical sights for firearms.

SUMMARY OF ONE EMBODIMENT OF THE INVENTION

Advantages of One or More Embodiments of the Present Invention

The various embodiments of the present invention may, but do not necessarily, achieve one or more of the following advantages:
provide an illumination system for optical sights that allows for combining an electric driven light source with a physical process driven light source to be switchable or used simultaneously;
provide a physical process driven light source for optical sights with the ability to increase or decrease the light density of the physical process driven light source;
provide increased light density of a physically driven light source in optical sights;
provide a sight that can be readily adapted to different lighting conditions by the provision of multiple light sources.

These and other advantages may be realized by reference to the remaining portions of the specification, claims, and abstract.

Brief Description of One Embodiment of the Present Invention

In one aspect of the present invention, there is provided an optical sight for use on a weapon. The optical sight may include a housing and an optical system within the housing that includes at least one lens element. The at least one lens element may comprise at least one focal point and at least one aiming mark. The sight may include a first light source and a second light source. At least one of the first light source and the second light source may be configured to illuminate the at least one aiming mark.

In one aspect of the present invention, there is a provided an optical sight for use on a weapon. The optical sight may include a housing and an optical system within the housing that includes at least one lens element. The sight may include an electric driven light source and a physical driven light source. At least one of the electric driven light source and the physical driven light source may be configured to illuminate at least one aiming mark of the optical sight.

In one aspect of the present invention, there is a provided a reflex sight comprising a housing and an optical system within the housing that includes at least one lens element comprising at least one focal point. The sight may include a first light source and a second light source. At least one of the first light source and the second light source may be configured to illuminate at least one aiming mark on the at least one lens element from the at least one focal point.

In one aspect of the present invention, there is a provided a riflescope comprising a housing and an optical system within the housing. The optical system may comprise at least one objective lens element, at least one erector element, at least one reticle plate comprising at least one aiming mark, and at least one ocular lens element. The riflescope may comprise a first light source and a second light source. At least one of the first light source and the second light source may be configured to illuminate the at least one aiming mark.

In one aspect of the present invention, there is provided an optical sight for use on a weapon. The optical sight may comprise lens means for providing at least one aiming mark. There may be a first light source means for illuminating the at least one aiming mark means and a second light source means for illuminating the at least one aiming mark means. Housing means for housing the optical means, the first light source means and the second light source means may also be provided.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized, and structural changes may be made without departing from the scope of the present invention.

There will be described herein a dual solution providing an improved illumination system for optical sights that combines multiple light sources in a way to make an illuminated aiming mark visible. The multiple light sources may be, for example, two electric power light sources, two physical process driven light sources, or a combination of an electric power light source and a physical process driven light source. The multiple light sources may be the same color or of different colors. In various embodiments, the dual systems may be used alternatively or simultaneously.

Figure 1:
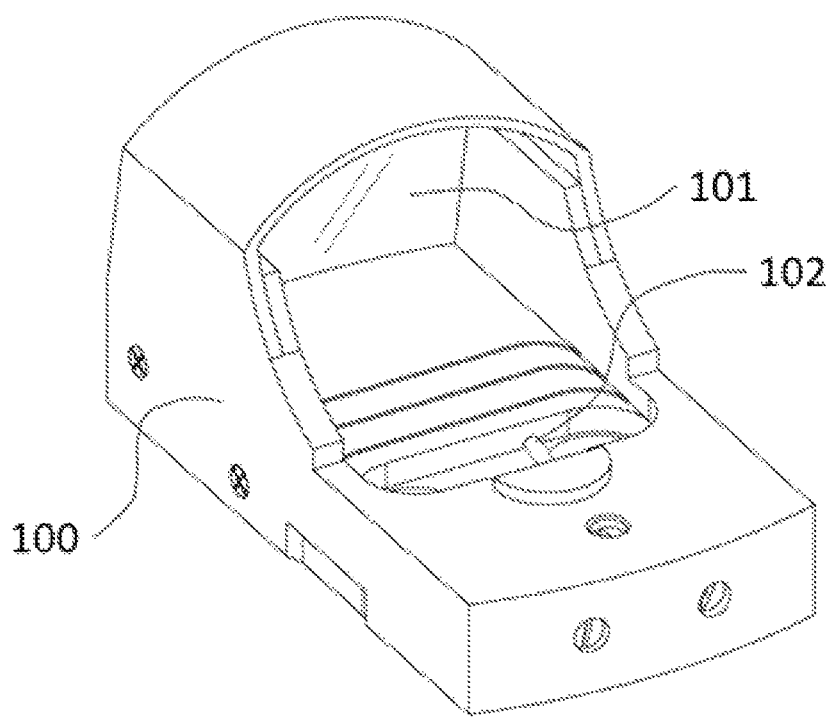
FIG. 1 substantially shows an example of a prior art reflex sight.

In one embodiment, the optical sight may be a reflex sight. A prior art reflex sight is depicted in FIG. 1. The sight features a housing 100, a lens 101 accommodated by the housing 100, and a light exit point 102, located in the focal point of said lens 101. In a prior art system, an LED light source may be positioned at the light exit point. Alternatively, an end of an optic fiber element may be positioned at the light exit point 102 with the optic fiber conducting light from a light source, such as an LED, to the exit point 102. Within the housing there may be additional electronic components including a battery, controls, circuit boards and wiring. A combination of illumination systems has heretofore been considered to be difficult, especially with regard to reflex sights, because a dual solution requires two separate light emission elements yet a reflex sight allows only one defined position of light emission at the focal point 102 of the sight's lens system 101.

Figure 2:
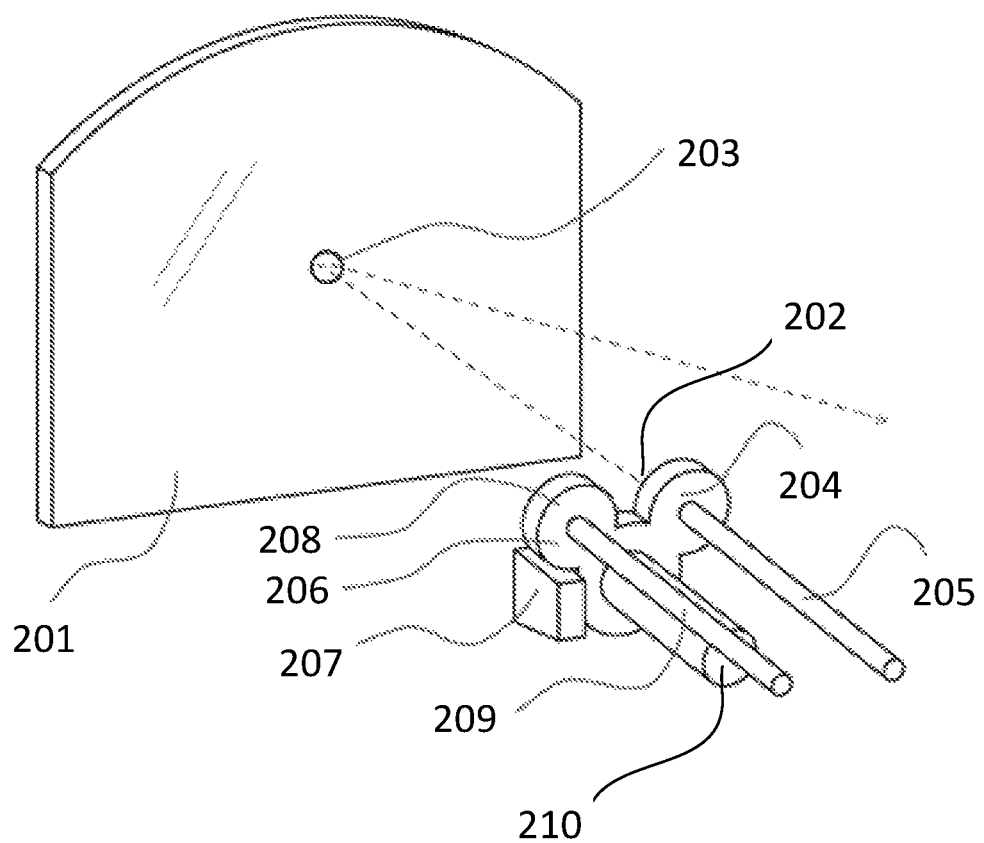
FIG. 2 substantially shows a reflex sight lens and two light sources in accordance with an embodiment of the present invention.

FIG. 2 shows an arrangement for providing a dual illumination solution for a reflex sight in accordance with an embodiment of the invention. In the depiction of FIG. 2, the housing of the sight, battery and associated electronics have been removed for clarity. The lens 201 of the reflex sight has an aiming mark 203 depicted by a first light source 204 driven by a first fiber optical element 205. The first light source 204 is held in place within a holder plate 206 at the focal point 202 of the lens 201. The holder plate 206 is connected to an axle 210 that allows the holder plate to be rotated between stops 207. A second light source 208 is also secured in place on the holder plate 206. The second light source 208 is driven by a second fiber optical element 209. The holder plate 206 can be rotated by the axle 210 to rotate the second light source 208 into the focal point of the lens 102, in order to depict aiming mark 203 by means of the second light source 208. The first fiber optic element 205 may be coupled to an electric driven light source, such as an LED. The second fiber optic element 209 may be coupled to a physically driven light source such as a GTLS. The LED may provide illumination of the aiming mark 203 during high level light conditions, such as during daylight hours. During low light levels, such as night, overcast, dawn and dusk, illumination source may be switched or alternated to the GTLS system to provide a lower level of illumination of the aiming mark 203. The switching system that rotates the hinge element 206 may simultaneously electrically toggle power to the LED so that the LED is not powered while the GTLS system is in use. The switching system may be hand operated, e.g. a dial, switch or lever, or may be electrically controlled via an actuator such as a push button or switch.

In an alternative embodiment, the first fiber optic element 205 may be coupled to an electric driven light source, such as a first LED of a first color such as red which may provide a suitable illumination for daytime. The second fiber optic element 209 may be coupled to a an electric driven light sources, such as a second LED of a second color such as green which may provide illumination suitable for night time or low light level use.

Figure 3:
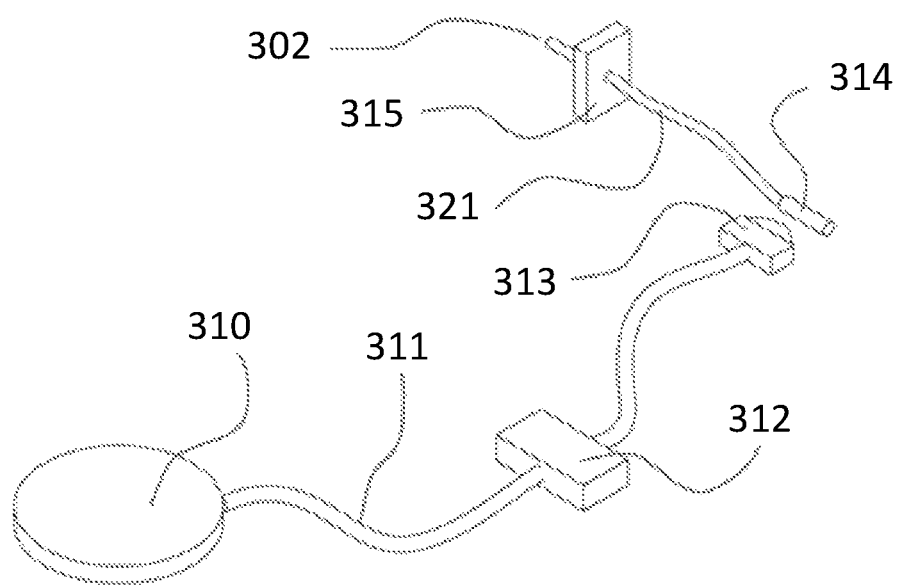
FIG. 3 substantially shows a physical driven light source, an electric driven light source and a dimming device in accordance with an embodiment of the present invention.

In a further embodiment, rather than alternating between light sources, the dual electrical/physical drive systems can be used simultaneously to increase the intensity of a physical driven light source. FIG. 3 shows an alternative embodiment of a dual illumination system. In this embodiment, a power source 310, powers an electric light source 313, e.g. an LED and in particular a UV emitting LED, by means of an electric connector 311 and a control element 312, e.g. a switch. The electric light source 313 is positioned closely to a GTLS element 314, enabling the electric light source 313 to excite the luminous material in the GTLS element 314, thus increasing the light density emitted by the GTLS element 314. An optical fiber element 321 is optically coupled to the GTLS element to conduct light to the exit point 302 located at the focal point of the lens of the reflex sight (not shown). A dimming element 315 in the optical pathway from the GTLS element 314 to the exit point 302 enables the system to reduce the light density towards the light exit point 302. The dimming device 315 may include an iris diaphragm, a partial shutter, at least one polarization filter or a LCD, among other dimmer types.

In one embodiment, the arrangement of FIG. 3 may be used in isolation so that there is only a single fiber output from the GTLS element with no separate LED coupled fiber at the light exit point. Alternatively, the arrangement of FIG.

3, in particular the optical fiber element 321, may be supported by one holder of the holder plate of FIG. 2. An additional optical fiber may be supported by a second holder of the holder plate. The additional optical fiber may be coupled to the same LED 313. Alternatively, the additional optical fiber may be coupled to an additional LED, such as a Red or Green LED which allows the user to alternate between illuminating the aiming mark from an LED (the additional LED) or the GTLS element via the UV LED.

In a further embodiment, the requirement for a moving holder plate may be removed by using a spliced optic fiber concept that collects the light from the electrically driven light source (LED) and the physically driven light source (GTLS) in two separate fibers that merge to one single fiber element to be placed at the light exit point to illuminate or depict an aiming mark. This allows both light sources to be used alternately and/or simultaneously.

Figure 4:
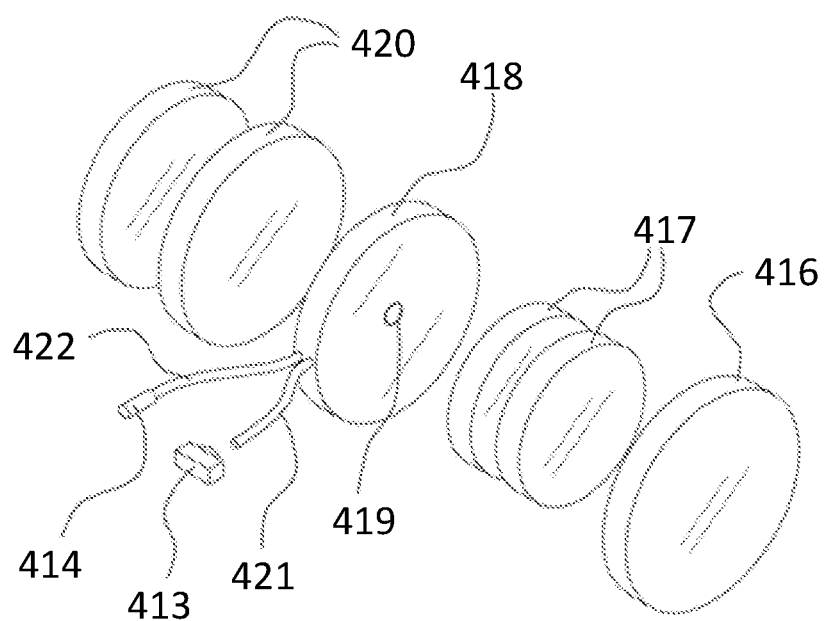
FIG. 4 substantially shows a riflescope optical system with a electric driven light source and a physical driven light source in accordance with an embodiment of the present invention.

A dual illumination solution may also be used in a telescopic sight. FIG. 4 shows an optical system of a telescopic sight such as a riflescope comprising an objective 416, an erector system 417, a glass reticle plate 418 and an ocular system 420. These components may be housed within a scope housing (not shown). The reticle plate 418 may be etched in a way to show an aiming mark superimposed onto the target image. An electric light source 413 is illuminating the reticle aiming mark 419 through light conduction by means of a first fiber optical element 421. The light exit point of said fiber optical element 421 is attached to the side of said transparent reticle plate 418 in a way that the etched surfaces aiming mark 419 lights up. In parallel or alternatively, a GTLS element 414 is illuminating the reticle aiming mark 419 through light conduction by means of a second fiber optical element 422. FIG. 4 shows the reticle plate 418 located in the first focal plane of the scope. In an alternative embodiment, the reticle may be located in the second focal plane.

In an alternative embodiment, a single fiber coupling to the reticle plate 418 may be used, with one or more GTLS-elements attached to the fiber optical element. The light exit point of the fiber optical element is attached to the side of said transparent reticle plate in a way that the etched surfaces aiming mark lights up. In addition, the riflescope may comprise an electric driven light source, such as an LED, one or more electronics compartments that accommodate a power source and control electronics for operating the electric driven light source. The LED is optically coupled to the GTLS-element so that the light emission of the LED lights up the GTSL-element, thus increasing the light density of the aiming mark. By increasing the brightness of the LED the light density of the aiming mark can be adjusted. In addition, the riflescope may comprise an electronic or mechanical shutter element positioned between the GTLS-element and the fiber optical element or along the fiber optical element towards the reticle plate in way that the light density can be reduced in order to reduce the light density of the aiming mark. Such a shutter element may include a manually driven iris diaphragm or an electronically modulated device such as an LCD panel or any other device able to reduce light transmission commonly known by a person skilled in the art.

In a further embodiment, two or more light sources may be positioned in the respective focal points of a dual- or multi-focus lens system of each respective lens. This allows switching between different light sources without moving the light sources in and out of a single-focus lens focal point position. As a further advantage of such a multi-focus system, each lens may be coated differently to optimize the reflection of each respective light source's wavelength.

Figure 5:
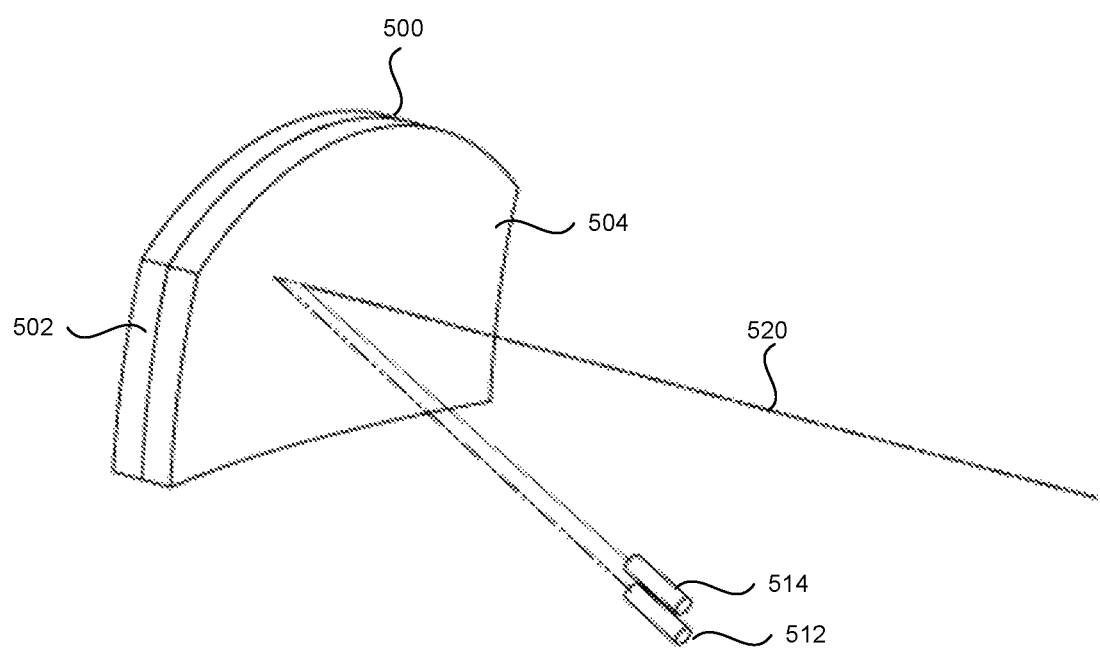
FIG. 5 substantially shows a perspective view of a multi-focus lens system utilizing two light sources.
Figure 6:
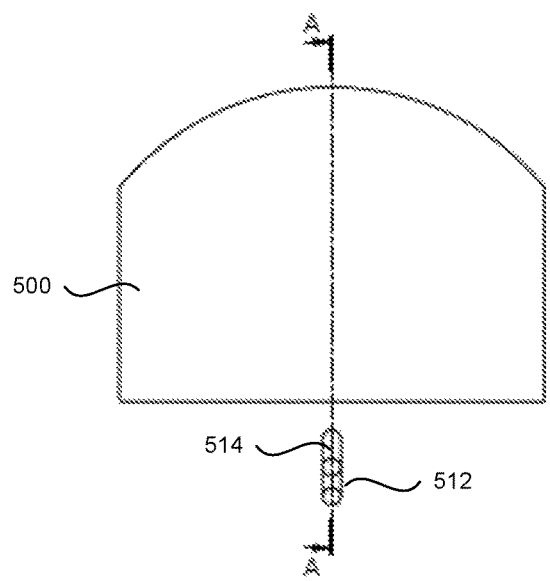
FIG. 6 substantially shows a rear view of the multi-focus lens system of FIG. 5.
Figure 7:
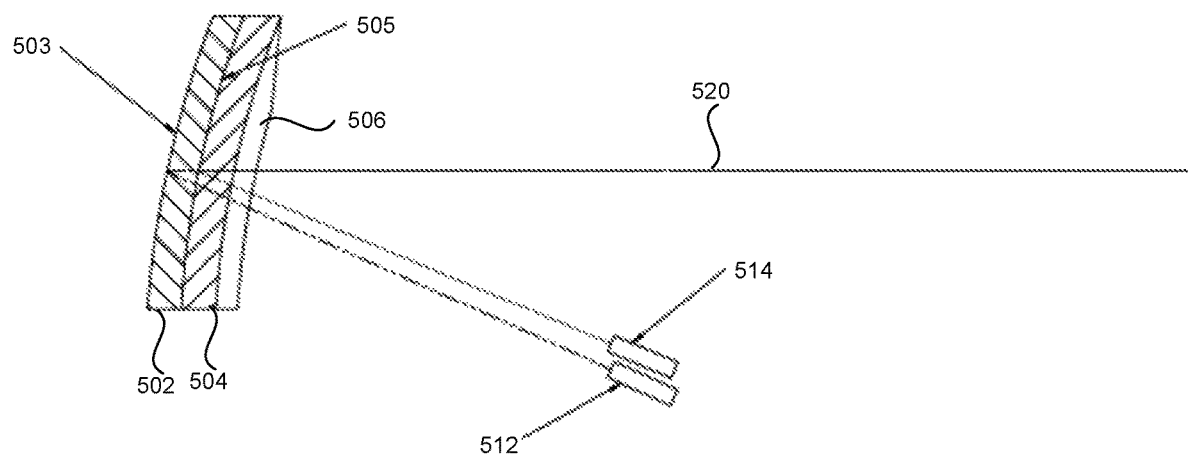
FIG. 7 substantially shows a side view taken through section A-A of FIG. 6.

A multi-focal lens system will be described with reference to FIGS. 5 to 7 in which FIG. 5 shows a perspective view of a multi-focal lens system 500, FIG. 6 shows a rear view of the multi-focal lens system and FIG. 7 shows a side section view of the section A-A shown in FIG. 6. In the multi-focal lens system 500, a first lens 502 is coupled to a second lens 504. The second lens may have a rear coating or protective lens layer 506. The first lens 502 may have a first focal point at which the exit point of a first light source 512 is disposed. The second lens may have a second focal point at which the exit point of a second light source 514 is disposed. The first and second light sources may be electric power light sources such as LEDs of the same or different colors. The first and second light sources may also be physical process driven light sources for example of the type described hereinabove. Combinations of electric power light sources and physical process driven light sources may be used. The first and second light sources may themselves be disposed at the respective first and second focal points. Alternatively, the first and second light source may be disposed elsewhere, and optical fibers may be used to conduct the light from the respective light source to the respective focal point for projection toward the lens.

In the shown compound/doublet lens example, the two lenses 502, 504—each with a different curvature—allow for the two different emitters to be used simultaneously or alternatively by the shooter. As shown in the side view of FIG. 7, light from the first source 512 is reflected by the reflector surface 503 of the first lens 502 along the viewing axis 520. Coatings on the first lens may be optimized to the color of the first light source. Similarly, light from the second light source 514 is reflected by the reflector surface 505 of the second lens 504 along the viewing axis 520. Coatings on the second lens may be optimized to the color of the second light source.

For the user looking through such a multi-focus lens system with different radii but focal points located in the same viewing axis, the aiming marks of the different light sources will appear in the same position relative to the target.

A particular advantage of the two separated light sources/focus points is, that the shooter may use two emitters, e.g. red and green, simultaneously, or independently and the reflection surfaces for each color are kept separate. This keeps coating cost down and allows for better quality/target image brightness and dot intensity.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. An optical sight for use on a weapon, the optical sight comprising:
   (A) a housing;
   (B) an optical system within the housing and comprising at least one lens element, the at least one lens element comprising at least one focal point and at least one aiming mark;
   (C) a first light source configured to illuminate the at least one aiming mark and comprising at least one Gaseous Tritium Light Source (GTLS) element; and
   (D) a second light source comprising at least one electric driven light source that is optically coupled to the at least one GTLS element so that a light output of the at least one electric driven light source illuminates the at least one GTLS element to increase the luminance of the at least one GTLS element.

2. The optical sight according to claim 1, wherein the optically coupled at least one electric driven light source comprises at least one UV LED.

3. The optical sight according to claim 1, wherein the at least one electric driven light source comprises at least one Ultraviolet light emitting element.

4. The optical sight according to claim 1, wherein one of the first light source and the second light source further comprises a second electric driven light source that is configured to illuminate the at least one aiming mark.

5. The optical sight according to claim 1, further comprising a dimming device that enables the luminance of the at least one GTLS element impinging on the at least one aiming mark to be reduced.

6. The optical sight according to claim 5, wherein the dimming device comprises at least one of an iris diaphragm, a partial shutter, at least one polarization filter and a Liquid Crystal Display (LCD) element.

7. The optical sight according to claim 1, wherein the optical sight is a reflex sight, wherein the first light source is configured to illuminate the at least one aiming mark of the at least one lens element from the at least one focal point.

8. The optical sight according to claim 1, wherein the optical sight is a telescopic sight, wherein the at least one lens element further comprises:
 (A) at least one objective lens element;
 (B) at least one erector element;
 (C) at least one reticle plate comprising the at least one aiming mark; and
 (D) at least one ocular lens element;
 (E) wherein the first light source is configured to illuminate the at least one aiming mark of the reticle plate.

9. A firearm comprising an optical sight according to claim 7.

10. A firearm comprising an optical sight according to claim 8.

* * * * *